(12) United States Patent
Stanton

(10) Patent No.: US 7,146,763 B1
(45) Date of Patent: Dec. 12, 2006

(54) FISHING POLE HOLDER

(76) Inventor: Roland Stanton, 3264 Highway 97 South, Cantonment, FL (US) 32533

( * ) Notice: Subject to any disclaimer, the term of this patent is extended or adjusted under 35 U.S.C. 154(b) by 0 days.

(21) Appl. No.: 11/203,723

(22) Filed: Aug. 15, 2005

(51) Int. Cl.
    *A01K 97/10* (2006.01)

(52) U.S. Cl. .................. 43/21.2; 114/364; 224/922

(58) Field of Classification Search .............. 43/21.2; 114/255, 364; 224/922
    See application file for complete search history.

(56) References Cited

U.S. PATENT DOCUMENTS

| | | | | |
|---|---|---|---|---|
| 1,174,319 A | * | 3/1916 | Hipwood | 224/922 |
| 1,198,202 A | * | 9/1916 | Drinkard | 43/21.2 |
| 1,223,884 A | * | 4/1917 | Johnstone | 224/922 |
| 1,406,571 A | * | 2/1922 | McCoy | 297/188.21 |
| 1,720,982 A | * | 7/1929 | Van Brunt | 224/922 |
| 1,985,985 A | * | 1/1935 | Gerline | 43/21.2 |
| 2,271,136 A | * | 1/1942 | Geiger | 224/922 |
| 2,499,117 A | * | 2/1950 | Smith | 43/21.2 |
| 2,576,624 A | * | 11/1951 | Miller | 43/21.2 |
| 2,598,021 A | * | 5/1952 | Schwanke | 43/21.2 |
| 2,742,210 A | * | 4/1956 | Bortz et al. | 224/922 |
| 3,009,612 A | * | 11/1961 | Fischett | 224/922 |
| 3,060,614 A | * | 10/1962 | Prince | 43/21.2 |
| 3,151,910 A | * | 10/1964 | Larson | 114/363 |
| 3,556,365 A | * | 1/1971 | Bull | 43/21.2 |
| 3,623,766 A | | 11/1971 | Funk | |
| 3,747,881 A | * | 7/1973 | Akamu | 43/21.2 |
| 3,782,613 A | * | 1/1974 | Davis | 224/922 |
| 3,783,547 A | * | 1/1974 | Bystrom et al. | 43/21.2 |
| 3,851,916 A | * | 12/1974 | Quartullo | 43/21.2 |
| 3,885,721 A | * | 5/1975 | Vanus | 224/922 |
| 3,902,269 A | * | 9/1975 | Dunlap | 43/21.2 |
| 4,008,500 A | * | 2/1977 | Hall, Jr. | 114/364 |
| 4,081,115 A | * | 3/1978 | White et al. | 43/21.2 |
| 4,086,676 A | * | 5/1978 | Arruza | 114/363 |
| 4,460,216 A | * | 7/1984 | Keller | 297/188.01 |
| 4,485,579 A | * | 12/1984 | Hawie | 43/21.2 |
| 4,578,891 A | * | 4/1986 | Murray | 43/21.2 |
| 4,597,356 A | * | 7/1986 | McCaghren et al. | 114/363 |
| 4,620,686 A | * | 11/1986 | Conant | 248/415 |
| D290,549 S | * | 6/1987 | Smith | D3/221 |
| 4,682,438 A | * | 7/1987 | Arrow | 43/21.2 |
| 4,753,029 A | | 6/1988 | Shaw et al. | |
| 4,802,612 A | * | 2/1989 | Anderson | 224/922 |
| 4,823,723 A | * | 4/1989 | Brooks | 43/21.2 |
| 4,828,152 A | * | 5/1989 | Pepping | 43/21.2 |
| 4,836,127 A | * | 6/1989 | Wille | 43/21.2 |
| 4,858,364 A | * | 8/1989 | Butts | 43/21.2 |
| 4,869,195 A | * | 9/1989 | Eichfeld | 43/21.2 |
| 4,876,980 A | * | 10/1989 | Bell, III | 43/21.2 |
| 4,879,963 A | * | 11/1989 | Dionne | 43/21.2 |
| 4,887,375 A | * | 12/1989 | Shedd et al. | 43/21.2 |

(Continued)

FOREIGN PATENT DOCUMENTS

DE            19707904 A1 *   9/1998

(Continued)

*Primary Examiner*—Darren W. Ark
(74) *Attorney, Agent, or Firm*—Peter Loffler

(57) ABSTRACT

A fishing pole holder is designed especially for use in catching large deep sea fish and has a bent and telescoping stanchion that is received in a standard pole holder found on a gunwale of a boat and other locations. A telescoping cross bar is attached to the top of the stanchion and has a padded member on one end and a gimble assembly on the other. The gimble assembly holds the fishing pole and allows pivoting along an X and Y axis. An arrester assembly is provided about the gimble assembly for safety should the fish pull down hard on the line of the fishing pole.

9 Claims, 3 Drawing Sheets

U.S. PATENT DOCUMENTS

| | | | |
|---|---|---|---|
| 4,979,458 A * | 12/1990 | Bouza | 114/363 |
| 5,014,891 A * | 5/1991 | King | 224/922 |
| D318,954 S * | 8/1991 | Parkhurst | D3/221 |
| 5,065,540 A * | 11/1991 | Potter, Jr. | 43/21.2 |
| 5,127,181 A * | 7/1992 | Teixeira | 43/21.2 |
| 5,592,893 A * | 1/1997 | Jordan et al. | 114/255 |
| 5,647,161 A * | 7/1997 | Miller, Sr. | 43/21.2 |
| 5,673,507 A * | 10/1997 | Stokes, Jr. | 43/21.2 |
| 5,738,035 A * | 4/1998 | Rupp, II | 43/21.2 |
| 5,738,257 A * | 4/1998 | McConnell | 43/21.2 |
| 5,778,817 A * | 7/1998 | Rupp | 43/21.2 |
| 5,855,086 A * | 1/1999 | Pandeles | 43/21.2 |
| 5,901,890 A * | 5/1999 | Stokes | 114/364 |
| 5,921,196 A * | 7/1999 | Slatter | 114/364 |
| 5,937,564 A * | 8/1999 | Perreault | 43/21.2 |
| 5,937,567 A * | 8/1999 | Elkins | 43/21.2 |
| 5,953,846 A * | 9/1999 | Shelton | 43/21.2 |
| 5,987,803 A * | 11/1999 | White | 43/21.2 |
| 5,992,081 A * | 11/1999 | Elkins | 43/21.2 |
| 6,045,109 A * | 4/2000 | Mashburn et al. | 43/21.2 |
| 6,053,122 A * | 4/2000 | Jordan, III | 43/21.2 |
| 6,089,652 A * | 7/2000 | Miller, Sr. | 43/21.2 |
| 6,141,898 A * | 11/2000 | Shelton | 43/21.2 |
| 6,209,253 B1 * | 4/2001 | Saldana, Jr. | 43/21.2 |
| 6,269,584 B1 * | 8/2001 | Peaschek | 43/21.2 |
| 6,269,990 B1 * | 8/2001 | Gray | 43/21.2 |
| 6,289,627 B1 * | 9/2001 | Gibbs et al. | 43/21.2 |
| 6,435,614 B1 * | 8/2002 | Gollahon | 297/344.1 |
| 6,557,292 B1 * | 5/2003 | Howard | 43/21.2 |
| 6,591,540 B1 * | 7/2003 | Chargois | 43/21.2 |
| 6,591,542 B1 * | 7/2003 | Jordan | 43/21.2 |
| 6,668,745 B1 * | 12/2003 | Slatter | 114/255 |
| 6,869,146 B1 * | 3/2005 | Gollahon | 43/21.2 |
| 6,983,560 B1 * | 1/2006 | Williams | 43/21.2 |
| 7,004,102 B1 * | 2/2006 | Sampson et al. | 114/364 |
| 2003/0221358 A1 * | 12/2003 | Matlosz | 43/21.2 |
| 2004/0206288 A1 * | 10/2004 | Wilcox et al. | 114/255 |
| 2005/0076556 A1 * | 4/2005 | Melville | 43/21.2 |
| 2005/0102881 A1 * | 5/2005 | Legendziewicz | 43/21.2 |
| 2006/0064920 A1 * | 3/2006 | Wilcox et al. | 43/21.2 |

FOREIGN PATENT DOCUMENTS

| | | | |
|---|---|---|---|
| FR | 2462864 A * | 3/1981 | |
| GB | 2039701 A * | 8/1980 | |
| GB | 2048633 A * | 12/1980 | |
| GB | 1601116 A * | 10/1981 | |
| GB | 2113982 A * | 8/1983 | |
| GB | 2227635 A * | 8/1990 | |
| GB | 2274049 A * | 7/1994 | |
| GB | 2285565 A * | 7/1995 | |
| GB | 2294189 A * | 4/1996 | |
| GB | 2413252 A * | 10/2005 | |
| JP | 9-248115 A * | 9/1997 | |
| JP | 10-28507 A * | 2/1998 | |
| JP | 2000-41557 A * | 2/2000 | |
| JP | 2000-83549 A * | 3/2000 | |
| JP | 2002-209494 A * | 7/2002 | |
| JP | 2002-262748 A * | 9/2002 | |
| WO | WO-97/42812 A1 * | 11/1997 | |
| WO | WO-02/35928 A1 * | 5/2002 | |
| WO | WO-03/022044 A1 * | 3/2003 | |

* cited by examiner

FISHING POLE HOLDER

BACKGROUND OF THE INVENTION

1. Field of the Invention

The present invention relates to a fishing rod holder especially designed for use in catching large fish wherein the fishing pole holder has a padded and adjustable rest and allows the user to rotate with the holder should the fish move underneath the boat.

2. Background of the Prior Art

Fishing is one of the most popular participant sports in the country. On a nice day, and even on a not so nice day, popular fishing spots are crowded with folks trying to catch the big one. As the saying goes, many a fisherman would rather have a bad day at fishing than a good day at work. By far the most popular method of catching fish during recreational fishing is by use of a fishing pole. The fishing pole may be as simple as a stick having a hook and bait on its end to be dropped into the water off a bridge or a dock. From there, fishing poles, and accompanying paraphernalia, can graduate to be quite elaborate and very expensive. One of the kings of fishing is deep sea fishing where the hopes of catching a massive fish, such as a sword fish or a tuna, are always at hand. Such fishing requires heavy duty rods with heavy duty line as well as bait and tackle—a hundred fifty pound fish is simply not going to be caught with a thirty pound test line. Many rods are available to haul in even the biggest of the large fish.

Having a solid fishing pole and similar strength line is ordinarily not enough when going after a large deep sea fish. Even a moderately sized fish can overpower a fisherman and either cost the fisherman his rod and reel or, during a fierce fight, may give the fisherman an unwanted swim. In order to aid the fisherman, various assist devices have been introduced. One of the most basic devices is the rod holder, which places the proximal or butt end of the fishing rod into a receiver, which receiver is attached to the boat or some appropriate structure on the boat. With the butt end of the fishing rod held within the receiver, the fisherman gains mechanical advantage over the fish and allows a fish that would otherwise overpower the fisherman, to be hauled in. Some fishing rod holders are placed in front of fishing chairs that allow a fisherman to be seated and buckled in during the fight. Fishing rod holders come in various shapes and sizes and range from the very simple to the very complex. The simple fishing rod holders are basic in design and operation, and while effective for a variety of uses, are somewhat limited in their ability to be used in a wide variety of situations. The complex fishing rod holders tend to be much more versatile, however, such devices tend to be overly expensive to manufacture and purchase, and are oftentimes difficult and time-consuming to assemble and operate.

SUMMARY OF THE INVENTION

The fishing pole holder of the present invention is designed to be used for all types of fishing, especially deep sea fishing where large fish are the target of the hunters. The fishing pole holder is of a relatively simple design and construction and is easy to assemble and operate, yet is very versatile in function, allowing a user to utilize the device in a wide variety of situations.

The fishing pole holder of the present invention is comprised of a stanchion that has a top end, a bottom end, and a medial section, the bottom end of the stanchion being adapted to be received within a pole receiver. A cross bar is attached to the top end of the stanchion and has a first end and a second end. A padded member is attached to the first end of the cross bar. A gimble assembly has a cup and a connecting arm that is attached to the second end of the cross bar. The medial section of the stanchion is bent at an obtuse angle. The stanchion is telescoping as is the cross bar. An arrester has a base bar attached to the second end cross bar and also has a U-shaped arrester rod extending from the base bar and positioned around and above the receiver cup. The arrester rod angles upwardly with respect to the receiver cup, in proceeding from the base bar. The cup receiver of the gimble assembly is pivotally attached to the connecting arm and can pivot on two separate axis with respect to the cross bar.

DESCRIPTION OF THE PREFERRED EMBODIMENT

Figure 1:
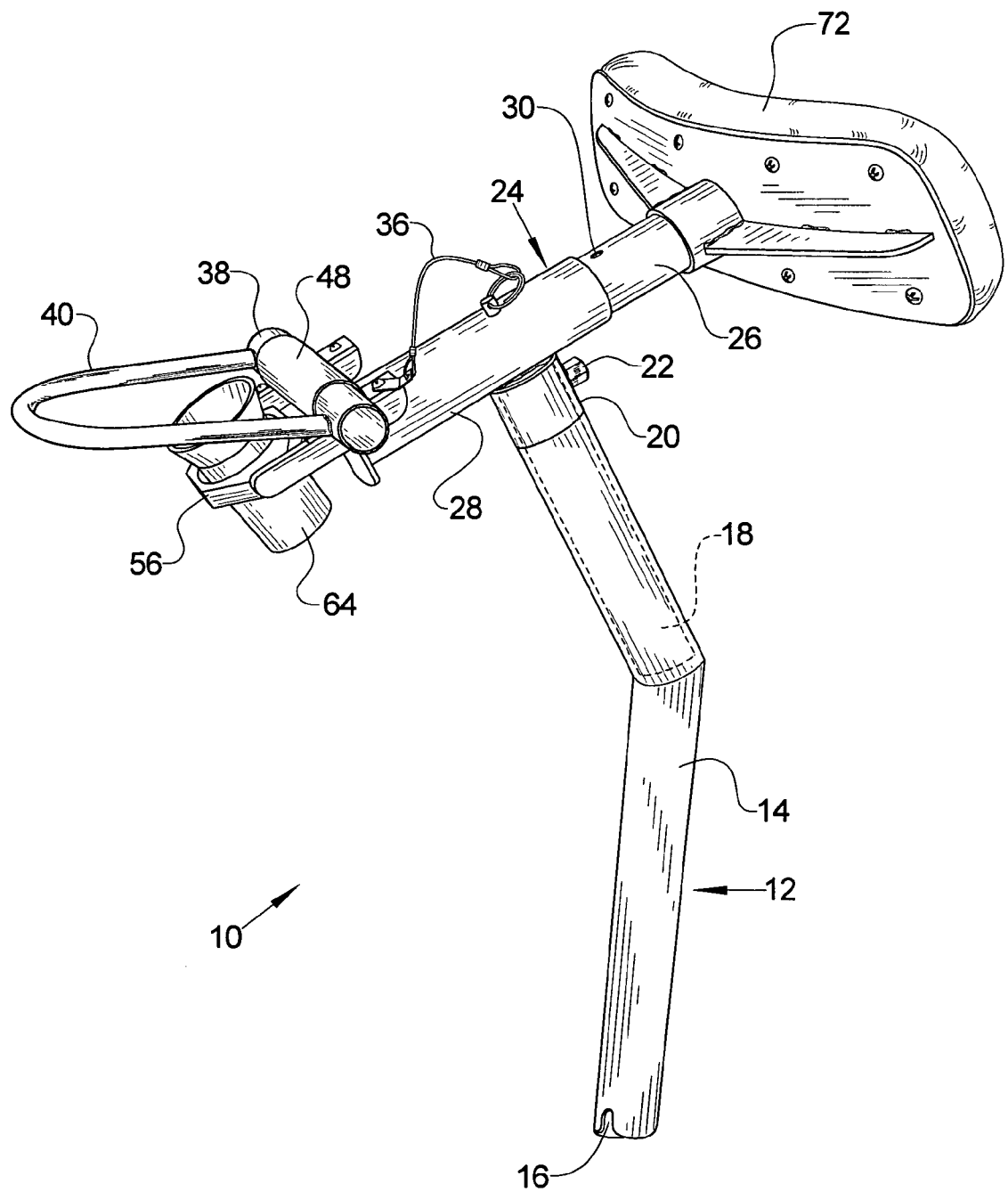
FIG. 1 is a perspective view of the fishing pole holder of the present invention.
Figure 2:
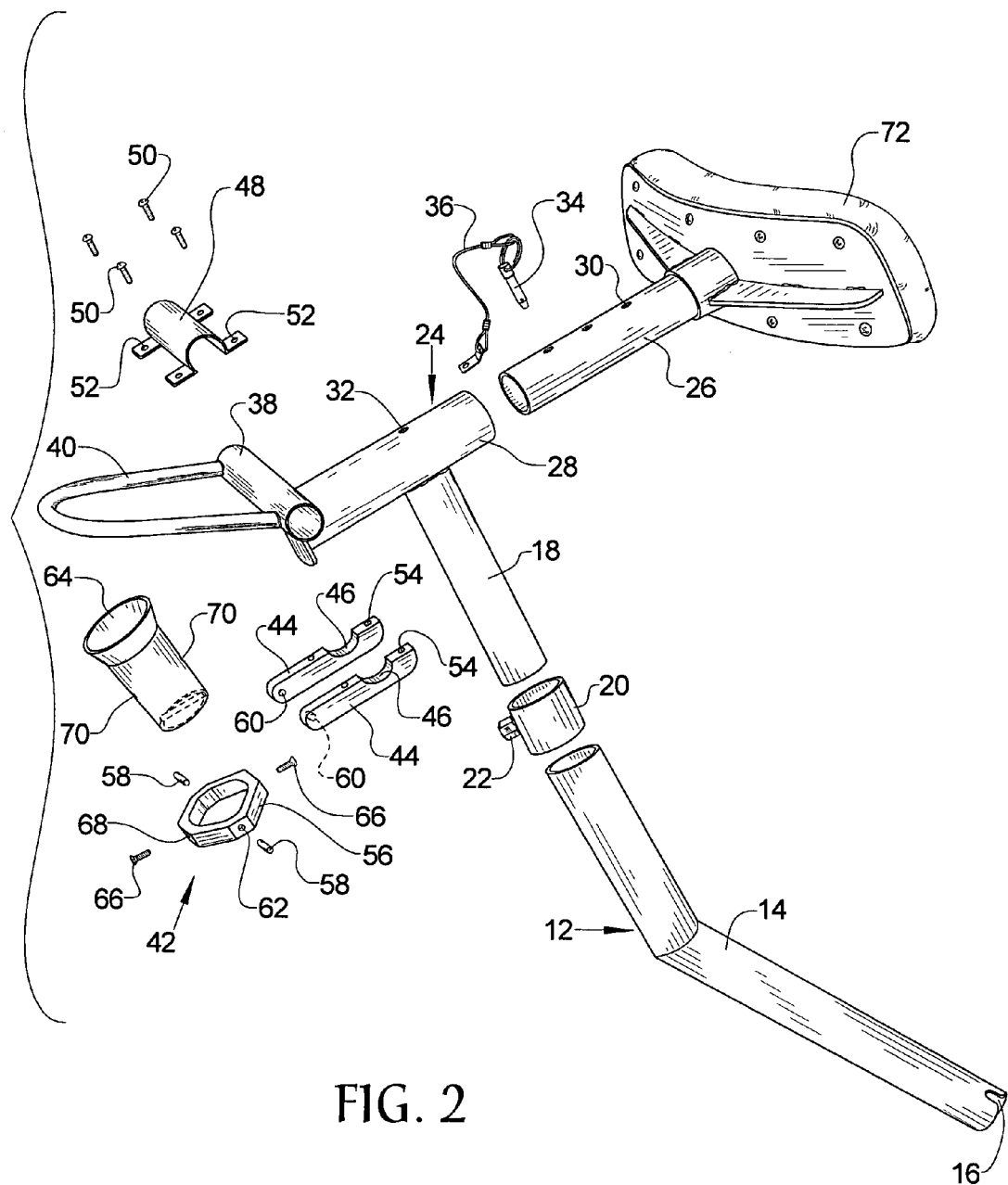
FIG. 2 is an exploded view of the fishing pole holder of the present invention.
Figure 3:
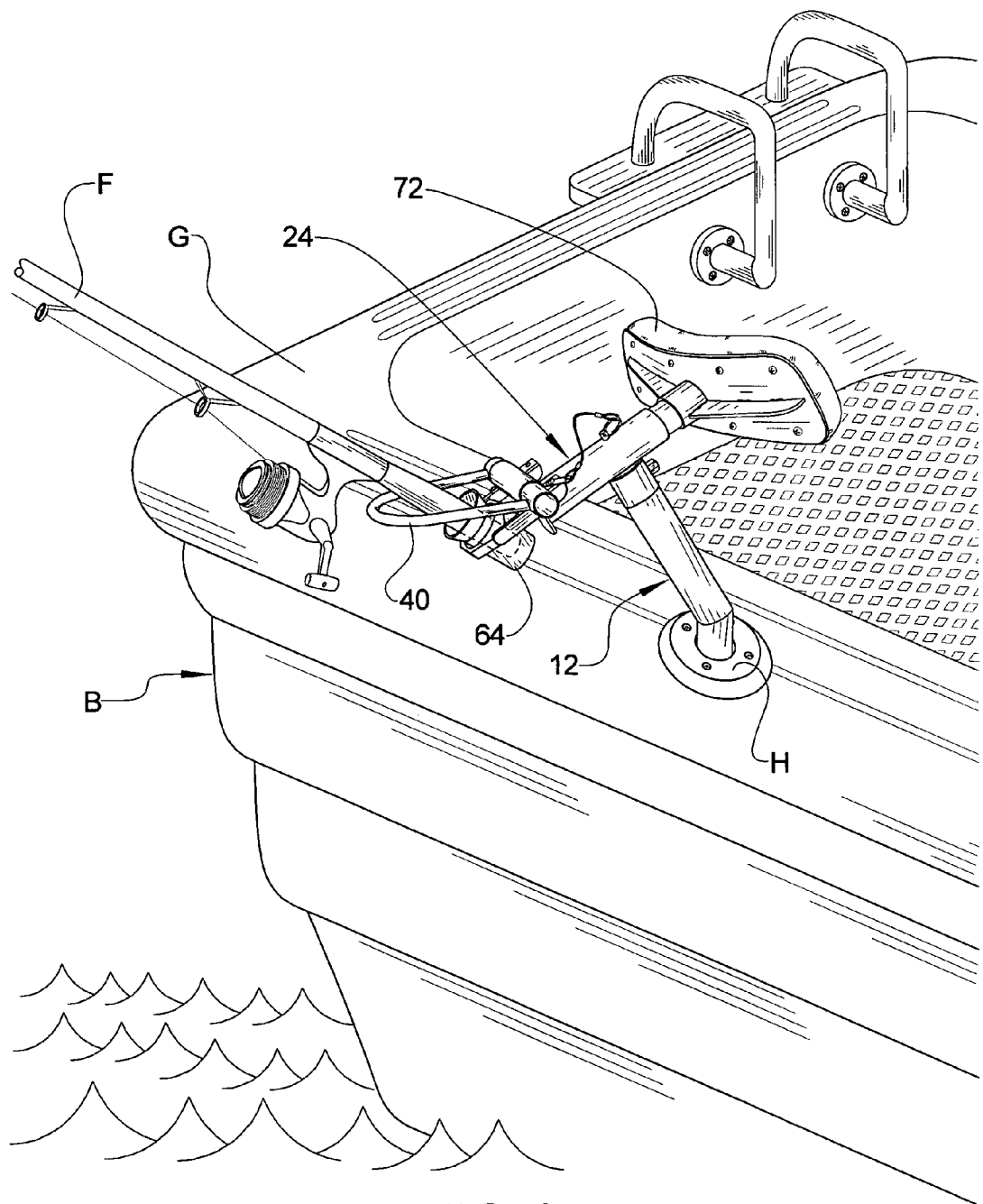
FIG. 3 is an environmental view of the fishing pole holder of the present invention installed on a fishing boat Similar reference numerals refer to similar parts throughout the several views of the drawings.

Referring now to the drawings, it is seen that the fishing pole holder of the present invention, generally denoted by reference numeral 10, is comprised of a stanchion 12 that is telescoping. As seen, the stanchion 12 has a lower section 14 that is a hollow tubular member that has a notch 16 and is bent at an obtuse angle and an upper section 18 that is received within the lower section 14 and is positioned at a desired height within the lower section 14 in order to achieve the telescoping ability of the stanchion 12. A locking collar 20 slides along the length of the upper section 18 and has a set screw 22 that presses against the upper section 18 in order to prevent the locking collar 20 from sliding thereal-ong. Therefore, in order to set the height of the stanchion 12, the locking collar 20 is positioned along the upper section 18 and when at the desired position, the set screw 22 is rotated in order to press against the upper section 18 and thereby prevent the locking collar 20 from moving. Thereafter, the upper section 18, by having an outer diameter that is less than the inner diameter (the diameter of the hollow portion) of the lower section 14, is inserted into the lower section 14, that is the portion of the upper section 18 that is below the locking collar 20, is inserted into the hollow interior of the lower section 14. The upper section 18 slides down into the lower section 14 until the locking collar 20 abuts the top of the lower section 14. As the locking collar 20 has a diameter that is greater than the inner diameter of the lower section 14, further inward movement of the upper section 18 into the lower section 14 is prevented. The upper section 18 is now gravitationally held within the lower section 14 yet allows easy removal of the upper section 18 from the lower section 14.

A cross bar 24 is affixed to the top of the stanchion 12 by appropriate means, such as by welding the two members 12 and 24 together. As seen, the cross bar 24 is also telescoping by providing a proximal section 26 that slides within a distal section 28. The proximal section 26 has a series of openings 30 therealong, one of which registers with an opening 32 located on the distal section 28. When the two openings 30 and 32 are registered, a pin 34 is passed through the opening pair 30 and 32 in order to maintain the proximal section 26 in a fixed position with respect to the distal section 28. The pin 34 may be attached to one of the sections 26 or 28 by a lanyard 36 in order to help prevent loss of the pin 34. Therefore, in order to change the length of the cross bar 24, the proximal section 26 is slid within the distal section 28 until the desired length of the cross bar 24 is achieved. If necessary, the length of the cross bar 24 is tweaked slightly in order for one of the openings 30 on the proximal section 26 to align with the opening 32 on the distal section 28 in order for the pin 34 to be inserted through the corresponding opening pairs 30 and 32.

As seen, located on the end of the distal section 28 of the cross bar 24 is a base bar 38 that has a generally U-shaped arrester bar 40 extending diagonally upwardly therefrom, together the base bar 38 and the generally U-shaped arrester bar 40 have a generally D-shape. A gimble assembly 42 is attached to this end of the distal section 28 of the cross bar 24. The gimble assembly 42 has a pair of connecting arms 44 that each have a notch 46 that receive the lower part of the base bar 38. A retainer clip 48 completes the encompassing of the base bar 38 and a series of screws 50 pass through openings 52 on the retainer clip 48 and corresponding openings 54 on the connecting arms 44 in order to hold the connecting arms 44 on the end of the distal section 28 of the cross bar 24. A receiver bracket 56 is pivotally held between the connecting arms 44 by passing a pair of screws 58 through openings 60 on the connecting arms 44 and corresponding openings 62 on the receiver bracket 56. This arrangement allows the receiver bracket 56 to pivot back and forth with respect to the connecting arms 44 and thus the cross bar 24. A receiver cup 64 is pivotally attached to the receiver bracket 56 by passing a pair of screws 66 through openings 68 located on the receiver bracket 56, which openings 68 are each spaced 90 degrees apart along the circumference of the receiver bracket 56 relative to the openings 62 that receive the screws 58 that attach the receiver bracket 56 to the connecting arms 44, and corresponding openings 70 located on the receiver cup 64. In this arrangement, the receiver cup 64 is pivotally attached to the receiver bracket 56 which is pivotally attached to the connecting arms 44, this pivotal attachment being spaced 90 degrees apart from the receiver cup 64 to receiver bracket 56 attachment. Therefore, the receiver bracket 56, holding the receiver cup 64 can pivot back and forth with respect to the cross bar 24 and the receiver cup 64 can pivot side to side with respect to the receiver bracket 56 and thus the cross bar 24. Accordingly, the receiver cup 64 can pivot with respect to the cross bar 24 along two different axis spaced 90 degrees apart.

Located on the end of the proximal section 26 of the cross bar 24 is a padded member 72 for receiving the torso region of a fishing person.

The stanchion 12, the cross bar 24, the arrester bar 40 and base bar 38 and the gimble assembly 42 are all made from an appropriate durable material such as metal, and, advantageously, out of a material that is able to withstand the harsh salt air associated with deep sea fishing, such as stainless steel, although other materials can also be used and can further have an appropriate corrosion resistant coating thereon. The padded member 72 is made from any appropriate cushioning material such as either open or closed cell foam and has, advantageously, an appropriate cover thereon, which cover, made from vinyl, plastic, etc., is also resistant to salt air.

In operation, the lower section 14 of the stanchion 12 is inserted into a standard basic rod holder H as may be found along the gunwale G of a boat B or other location. The height of the stanchion 12 is adjusted as needed. Thereafter, the length of the cross bar 24 is adjusted as needed. A fishing pole F has its butt end received within the receiver cup 64. A fishing person places his or her torso against the padded member 72 and grasps the fishing pole F as needed. The angled stanchion 12 allows the cross member 24 to have a desired upward slope toward the fishing person. During fishing, especially when a fish is on the line, the dual axis pivoting of the receiver cup 64 allows the fishing person to have the fishing pole F stay within the device 10 while allowing for movement to the left or right (receiver cup 64 pivoting with respect to the receiver bracket 56) as well as back and forth (receiver bracket 56 pivoting with respect to the connecting arms 44). Additionally, as the stanchion 12 is loosely held within the rod holder H of the boat B, should the fish go underneath the boat B, the entire device 10 can be spun around within the rod holder H in order to stay with the fish. Alternately, the upper section 18 of the stanchion 12 can rotate with respect to the lower section 14 of the stanchion in order to rotate with respect to fish movement. If the fish pulls hard downwardly on the line causing the fishing pole F to jerk downwardly in response, the arrester bar 40 catches the fishing pole F preventing loss of the fishing pole F. As the fishing person is pressed against the padded member 72, the fishing person is relatively comfortable even while fighting the big one.

While the invention has been particularly shown and described with reference to an embodiment thereof, it will be appreciated by those skilled in the art that various changes in form and detail may be made without departing from the spirit and scope of the invention.

I claim:

1. A pole holder comprising:
a stanchion, having a top end, a bottom end, and a medial section, the bottom end adapted to be received within a pole receiver;
a cross bar attached to the top end of the stanchion, the cross bar having a first end and a second end;
a padded member attached to the first end of the cross bar;
a gimble assembly having a receiver cup and a connecting arm attached to the second end of the cross bar; and
a D-shaped arrester attached to the second end of the cross bar positioned above and in encompassing relationship with the receiver cup, said arrester having a base bar attached to the second end of the cross bar and having a U-shaped arrester rod extending from the base bar and positioned around and above the receiver cup, the U-shaped arrester rod having first and second ends, each of said first and second ends being attached to a respective end of the base rod, the connecting arm being attached to the base bar at one end and to the receiver cup at an other end, and the arrester rod angles upwardly with respect to the receiver cup, in proceeding from the base bar.

2. The pole holder as in claim 1 wherein the medial section of the stanchion is bent.

3. The pole holder as in claim 1 wherein the medial section of the stanchion is bent at an obtuse angle.

4. The pole holder as in claim 1 wherein the stanchion is telescoping.

5. The pole holder as in claim 4 wherein the medial section of the stanchion is bent.

6. The pole holder as in claim 4 wherein the medial section of the stanchion is bent at an obtuse angle.

7. The pole holder as in claim 1 wherein the cross bar is telescoping.

8. The pole holder as in claim 1 wherein the receiver cup is pivotally attached to the connecting arm.

9. The pole holder as in claim 1 wherein the receiver cup pivots on two separate axes with respect to the cross bar.

* * * * *